United States Patent
Kiik et al.

(10) Patent No.: US 8,389,103 B2
(45) Date of Patent: Mar. 5, 2013

(54) ROOFING MATERIAL

(75) Inventors: Matti Kiik, Richardson, TX (US); Daniel LaVietes, Dallas, TX (US); Michael L. Bryson, Independence, MO (US); Younger Ahluwalia, Desoto, TX (US); Margie A Beerer, Ennis, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 1082 days.

(21) Appl. No.: 11/377,115

(22) Filed: Mar. 16, 2006

(65) Prior Publication Data

US 2007/0218250 A1 Sep. 20, 2007

(51) Int. Cl.
 *D06N 7/04* (2006.01)
 *E01F 9/04* (2006.01)
 *G11B 5/64* (2006.01)
(52) U.S. Cl. ......................... 428/143; 428/141
(58) Field of Classification Search .................. 428/141, 428/143
 See application file for complete search history.

(56) References Cited

U.S. PATENT DOCUMENTS

| | | | | |
|---|---|---|---|---|
| 3,387,420 A | * | 6/1968 | Long | 52/302.3 |
| 3,813,280 A | | 5/1974 | Olszyk et al. | 428/141 |
| 4,636,414 A | * | 1/1987 | Tajima et al. | 428/40.3 |
| 5,037,685 A | | 8/1991 | Richards et al. | 428/40.5 |
| 5,178,960 A | | 1/1993 | Cook | 28/461 |
| 5,195,290 A | * | 3/1993 | Hulett | 52/518 |
| 5,571,596 A | | 11/1996 | Johnson | 428/143 |
| 5,733,624 A | | 3/1998 | Syme et al. | 428/68 |
| 5,822,943 A | | 10/1998 | Frankoski et al. | 52/518 |
| 5,965,257 A | | 10/1999 | Ahluwalia | 428/357 |
| 6,133,168 A | | 10/2000 | Doyle et al. | 442/76 |
| 6,228,785 B1 | | 5/2001 | Miller et al. | 442/148 |
| 6,341,462 B2 | | 1/2002 | Kiik et al. | 52/518 |
| 6,426,309 B1 | * | 7/2002 | Miller et al. | 442/148 |
| 6,673,432 B2 | | 1/2004 | Kiik et al. | 428/301.1 |
| 6,708,456 B2 | | 3/2004 | Kiik et al. | 52/98 |
| 6,764,733 B1 | | 7/2004 | Clarke | 428/40.3 |
| 6,936,329 B2 | | 8/2005 | Kiik et al. | 428/141 |
| 2004/0127120 A1 | | 7/2004 | Zanchetta et al. | 442/45 |
| 2004/0161570 A1 | | 8/2004 | Zanchetta et al. | 428/40.1 |
| 2005/0130519 A1 | | 6/2005 | Rodrigues et al. | 442/54 |

OTHER PUBLICATIONS

Philange, T., :What Are the Signs That You Need a New Roof?, http://www.ehow.com/info_7965766_signs-need-new-roof.html (2 pages).
Cullen, W. "Research and Performance Experience of Asphalt Shingles," 10th Conference on Roofing Technology, Apr. 1993(7 pages).

* cited by examiner

*Primary Examiner* — Maria Veronica Ewald
*Assistant Examiner* — Nathan Van Sell
(74) *Attorney, Agent, or Firm* — Fitzpatrick, Cella, Harper & Scinto

(57) ABSTRACT

Roofing material consists essentially of a substrate, a hot melt material applied to one side of the substrate, an asphalt material coating the other side of the substrate and roofing granules disposed on said asphalt material coated on the substrate. The hot melt material may be polyethylene, polyethylene-vinyl acetate, polypropylene, polyvinylidene chloride, polyester, nylon and mixtures thereof. The asphalt material may include non-asphaltic filler.

6 Claims, No Drawings

ROOFING MATERIAL

FIELD OF THE INVENTION

This invention relates to roofing material, and in particular to roofing shingles, having a novel backing which renders the material lighter than traditional roofing products while providing excellent tear strength.

BACKGROUND OF THE INVENTION

Roofing material has an upper surface intended to be exposed to weather and a lower surface facing in the direction opposite to the upper surface. Traditionally, the lower surface or back of roofing material such as shingles has been coated with asphalt material and covered with finely ground mineral material (fines) so that the asphalt backing does not adhere to contiguous roofing material when packaged for transport and storage. Such finely divided materials include mica flakes, copper slag, coal slag, sand, talc and silica dust. With increasing costs of petroleum based products, it is desirable to reduce the amount of weight of roofing materials (thereby decreasing transportation expenses) and to reduce the asphalt component raw material cost.

SUMMARY OF THE INVENTION

In accordance with the invention, roofing materials such as shingles are improved by making them lighter and more tear resistant. The roofing material of the present invention consists essentially of a substrate; a hot melt material applied to one side of the substrate; an asphalt material coating the other side of the substrate; and roofing granules disposed on the asphalt material which is coated on the substrate. The hot melt material may be any material that may be extruded from a sheet die and/or melted into a curtain. Examples include, but are not limited to, polyethylene, polyethylene-vinyl acetate, polypropylene, polyvinylidene chloride, polyester, nylon and mixtures thereof. Preferably, the hot melt material is black pigmented. The asphalt material may include non-asphaltic filler.

DETAILED DESCRIPTION

Asphalt roofing materials, including shingles, have traditionally and extensively been manufactured by using as a base a fibrous web such as a sheet of roofing felt or fiberglass mat, impregnating the fibrous web with a bituminous material and coating one or both surfaces of the impregnated web with a weather-resistant bituminous coating material. The bituminous coating material usually contains a mineral filler such as slate flour or powdered limestone. Sometimes one or more fibrous sheets are laminated with one or more bituminous layers. Usually there is applied to the bituminous coating on the surface intended to be exposed to the weather a suitable granular material such as slate granules or mineral surfacing. Finely divided materials such as mica flakes, talc, silica dust or the like may be made adherent to the non-weather exposed surface of the roofing shingle to prevent sticking of the adjacent layers of the roofing material in packages.

In the present invention, the asphalt and fines on the back of roofing material are replaced with a hot melt material that is preferably extruded on to one side of a substrate. The hot melt material seals the substrate. Acceptable hot melt materials have a Melt Flow Index in the range of from about 0.1 to about 70. A preferred Melt Flow Index range is from about 3 to about 30 and the most preferable range is from about 5 to about 15. In accordance with one embodiment of the invention, the substrate, preferably a fiberglass mat, is sealed on one side by extruding thereon a hot melt material such as low or high density polyethylene, polyethylene-vinyl acetate, polypropylene, polyvinylidene chloride, polyester, nylon and mixtures thereof. Polyethylene is the preferred hot melt material. It may be branched or, preferably, linear. Recycled polymers may be a source of the hot melt material. The hot melt material is preferably pigmented. Pigment colors are selected to complement the particular roofing material. For example, if the roofing material is of the "cool roof" type and has a light color to enhance reflectivity, then the pigment of choice may be blue. For traditional roofing installations, the hot melt material is preferably black-pigmented.

The other side of the substrate is then coated in the traditional manner with hot asphalt material and thereafter roofing granules are disposed thereon. The asphalt may include filler material such as limestone, talc, ground oyster shells, rice hulls and mixtures thereof. In a preferred embodiment the filled asphalt material is approximately 65% limestone and 35% asphalt. The roofing material is thereafter cut to produce the desired roofing product, such as roofing shingles. The resulting products are lighter than traditional roofing materials, yet have excellent tear strength.

In a specific embodiment, fiberglass Mat T 1517D, available from Elk of Ennis, Tex., was employed as a substrate. The substrate is preferably a standard roofing shingle fiberglass mat having a thermosetting resin binder. However, blends of fiberglass and other, synthetic fibers may also be utilized. Such blends may include from about 0% to about 30% of polyethylene, polypropylene or nylon, and combinations thereof. The weight of the mat ranges from about 1.0 lb./sq. to about 3.0 lb./sq. Fiberglass fibers comprise from approximately 73% to about 88% (preferably 85%) of the mat and the amount of binder ranges from approximately 10% to about 30% of the mat. Urea formaldehyde is the preferred binder, but other suitable binders include thermosetting acrylic, melamine formaldehyde and phenol formaldehyde. The resin bound glass mat should be capable of withstanding the processing temperatures described below.

Black pigmented linear low density polyethylene was extruded on to one side of the substrate at 1.5 lb./sq. and also at 1.0 lb./sq. and 0.5 lb./sq. It is generally accepted in the roofing industry that a "square" is 100 ft.$^2$ of material. The extrudate was in the form of a curtain of hot melt material (at approximately 600° F.) which was applied to the mat from an extruder through a die. The line speed was approximately 200 ft./min. and the thickness of the coating was approximately 0.002 in. for the 1.0 lb./sq. extrudate. Solidification commenced at a nip which had a cooled bottom roll. Bonding may be enhanced at a heated nip thereafter. After extrudate solidification, the coated substrate was wound up and transported to a standard roofing shingle manufacturing line where hot filled asphalt material (at about 500° F.) was coated on the other side of the substrate. Physical properties of the coated substrate are reported in Table I below. Although roofing granules were not applied to the asphalt material coated substrate, such application could have been accomplished on a roofing material production line in accordance with standard techniques. Alternatively, in one manufacturing line, the hot melt material may be applied to one side of the substrate, then the coating cooled and the resulting coated substrate fed directly to a roofing material production line where an asphalt material is coated on the other side of the substrate and then roofing granules are disposed on the hot asphalt material. Moreover, a dusting of small mineral particles or fines may be pressed into the surface of the hot melt material to permit roll up and/or packaging without undesirable product adhesion.

EXAMPLES

Table I below includes data showing the physical properties of uncoated substrate and the substrate coated with extrudate at 1.5 lb./sq. (Example I), 1.0 lb./sq. (Example II) and 0.5 lb./sq (Example III). The 0.5 lb./sq. extrudate did not adequately adhere to the substrate mat. The 1.0 lb./sq. extrudate appeared to be the optimum weight.

TABLE I

| Sample | | T1517D Bare Mat | Example I | Example II | Example III |
|---|---|---|---|---|---|
| Extrudate Wt (lb/sq) | | — | 1.5 | 1.0 | .05 |
| Film Weight (lb/sq) | | — | — | — | — |
| Total Basis Weight (lb/sq) | | 1.84 | 3.23 | 2.71 | 2.60 |
| Thickness (mil) | | 31 | 21 | 23 | 23 |
| Loss on Ignition (%) | | 16.2 | — | — | — |
| Frazier Porosity (cfm/ft2) | | 728 | <1.0 | 1.1 | 1.3 |
| Tensile | MD | 119 | 128 | 110 | 95 |
| (lb/3" width) | CD | 50 | 62 | 42 | 41 |
| Elmendorf Tear | MD | 378 | 322 | 277 | 269 |
| (gram) | CD | 679 | 413 | 415 | 506 |
| Samples coated with filled asphalt. Total Basis Weight (lb/sq.) | | 53.96* | 42.30 | 43.08 | 42.35 |
| Samples coated with filled asphalt Elmendorf Tear (gram) | MD | 1214* | 1180 | 1259 | 982 |
| | CD | 1505* | 1964 | 2022 | 1432 |

*Filled asphalt coated both sides of the bare mat sample

The data in Table I show that, of the four samples coated with filled asphalt, Example II had the highest tear resistance. The asphalt coated T 151 7D bare mat showed a lower resistance to tear (1214 MD/1505 CD) than Example II (1259 MD/2022 CD) even though the former sample was coated on both sides with filled asphalt and had a higher total basis weight (53.96 lb./sq.) than Example II (43.08 lb./sq.).

It should be understood that the above examples are illustrative, and that compositions other than those described above can be used while utilizing the principles underlying the present invention. For example, the hot melt material may be applied to the substrate by means other than extrusion such as standard transfer roll coating techniques.

What is claimed is:

1. A roofing material having an upper surface and a lower surface, said roofing material consisting essentially of:
   (a) a substrate consisting essentially of a fibrous web;
   (b) a hot melt material applied directly upon one side of said substrate, wherein said lower surface of said roofing material comprises said hot melt material;
   (c) an asphalt material applied directly upon the other side of said substrate; and
   (d) roofing granules disposed directly upon said asphalt material, wherein said upper surface of said roofing material comprises said asphalt material and said roofing granules.

2. The roofing material according to claim 1, wherein said hot melt material is selected from the group consisting of polyethylene, polyethylene-vinyl acetate, polypropylene, polyvinylidene chloride, polyester, nylon and mixtures thereof.

3. The roofing material according to claim 1, wherein said asphalt material includes non-asphaltic filler.

4. The roofing material according to claim 3, wherein said non-asphaltic filler is limestone.

5. The roofing material according to claim 1, wherein said hot melt material is applied at over 0.5 lb./sq.

6. The roofing material according to claim 5, wherein said hot melt material is applied at 1.0 lb./sq to 1.5 lb./sq.

* * * * *